United States Patent [19]

Howe et al.

[11] Patent Number: 5,590,171
[45] Date of Patent: Dec. 31, 1996

[54] METHOD AND APPARATUS FOR COMMUNICATIONS MONITORING

[75] Inventors: Wayne Howe, Alpharetta; Dale Malik, Dunwoody, both of Ga.

[73] Assignee: BellSouth Corporation, Atlanta, Ga.

[21] Appl. No.: 517,648

[22] Filed: Aug. 21, 1995

Related U.S. Application Data

[63] Continuation of Ser. No. 271,191, Jul. 7, 1994, abandoned.

[51] Int. Cl.$^6$ .......................... H04M 1/24; H04M 3/08; H04M 3/22
[52] U.S. Cl. .................. 379/33; 379/1; 379/2; 379/6; 379/7; 379/27; 379/28; 379/29; 379/34; 379/35
[58] Field of Search ................... 379/1, 2, 6, 7, 379/33, 34, 35, 95, 201, 202, 203, 208, 249, 265, 266, 27, 28, 29

[56] References Cited

U.S. PATENT DOCUMENTS

| | | | |
|---|---|---|---|
| 3,704,348 | 11/1972 | McIntosh | 379/35 |
| 3,851,121 | 11/1974 | Marvin | 379/35 |
| 4,527,015 | 7/1985 | Chambers | 379/35 |
| 4,559,416 | 12/1985 | Theis | 379/34 |
| 4,712,230 | 12/1987 | Rice | 379/112 |
| 4,815,120 | 3/1989 | Kosich | 379/34 |
| 4,831,648 | 5/1989 | Nishino | 379/95 |
| 4,839,917 | 6/1989 | Oliver | 379/33 |
| 4,901,341 | 2/1990 | Carter et al. | 379/67 |
| 4,924,488 | 5/1990 | Kosich | 379/34 |
| 5,142,560 | 8/1992 | Neer | 379/7 |
| 5,199,062 | 3/1993 | Von Meister et al. | 379/89 |
| 5,206,901 | 4/1993 | Harlow et al. | 379/211 |
| 5,243,642 | 9/1993 | Wise, Jr. et al. | 379/82 |
| 5,299,260 | 3/1994 | Shaio | 379/265 |
| 5,309,505 | 5/1994 | Szlam et al. | 379/266 |
| 5,351,287 | 9/1994 | Bhattacharyya | 379/35 |

Primary Examiner—Wellington Chin
Assistant Examiner—Vijay Shankar
Attorney, Agent, or Firm—Jones & Askew

[57] ABSTRACT

A method and apparatus for allowing a communication from a calling party (120) to a called party (130) to be monitored by a monitoring party (140) and/or recorded (180, 190). Upon receipt of a communication, the service node (180) of the system reads identification information associated with the communication and establishes a bridge for the communication between the calling party (120) and the called party (130), and establishes a bridge from the communication to a monitoring party (140) and/or to a recorder (180, 190) in accordance with the identification information. In response to receiving an indication from the monitoring party (140) to tear down the bridge, the system tears down the bridge. However, the communication remains connected between the calling (120) and called (130) parties. Neither the calling party (120) nor the called party (130) are aware of the monitoring or of the recording of the communication or of the discontinuation of the monitoring.

22 Claims, 5 Drawing Sheets

METHOD AND APPARATUS FOR COMMUNICATIONS MONITORING

This is a continuation of application Ser. No. 08/271,191, filed Jul. 7, 1994, now abandoned.

TECHNICAL FIELD

The present invention generally relates to telecommunications systems, and more particularly, relates to a method and apparatus for monitoring telecommunications.

BACKGROUND OF THE INVENTION

Impolite receptionists, discourteous reservationists and rude operators are fast disappearing because of increased attention paid to consumer services, and especially because of increased employer monitoring of consumer telecommunications services performed by employees. For example, the telecommunications performance by a receptionist may be monitored by a supervisor to insure the receptionist projects the proper image of the employer. Myriad employers, including the airline, auto rental, hotel/motel and restaurant industries, have realized that poor telephone performance can drive a customer directly into the hands (and to the telephones) of the competition.

Similarly, the performance of telemarketing personnel often is monitored to evaluate and improve sales performance with the hope of resultant sales increases. Thus, your next telephone conversation with a salesperson selling an insurance policy, a pest control service, or a set of steak knives may include a third (albeit silent) participant in the form of a sales supervisor monitoring the salesperson's techniques.

In addition, selective monitoring of telecommunications is carried out by law enforcement personnel. The aim of such monitoring is to gain information of a kind much different from an evaluation of telephone manners or sales performance. Yet, the technical difficulties in telecommunications monitoring encountered by law enforcement personnel are the same as the difficulties in monitoring faced by the sales and service industries.

In particular, a major disadvantage slowing the increased use of telecommunications monitoring systems is the limitation of prior art monitoring systems to localized area monitoring. Generally, prior art systems require the monitoring telephone line and the monitored telephone line to be close enough so that a mechanical connection or bridge between the lines can be set up. Based on this act of mechanically tapping into the monitored fine, the term "wiretapped" was coined. For most prior art systems, the bridge between the monitoring and monitored lines is set up at a local switch within the public switched telephone network (PSTN) or the private branch exchange (PBX) where both lines are present. The necessity of the mechanical connection between the monitoring and monitored lines limits the monitoring lines to those present in the local switch, and also limits the monitoring lines to those lines serving the local area.

Prior art localized monitoring has been sufficient for businesses having the monitoring and monitored lines routed through the same local switch. For example, the sales supervisor of a mail-order business having two or more telephone fines can monitor a sales line through the establishment of a bridge between the sales line and the supervisory line at the local switch or in the company's PBX. However, there is little flexibility in changing this monitoring set-up at the local switch. To monitor the other sales lines of the business, the sales supervisor must have a mechanical connection made between the monitoring line and each of the other lines to be monitored. Some telephone marketing systems have an integral PBX or can interact with the customer's PBX. In these telephone marketing systems the supervisor's workstation typically has a computer terminal so that the supervisor can specify which salesperson is to be monitored. With training, the supervisor then can instruct the system as to the salesperson to be monitored.

Prior art localized monitoring systems are insufficient in situations where the monitoring line and the monitored line are not both present at the local switch or otherwise in close proximity. Using the previous example, if the salesperson for the mail-order business works out of a sales office different from the office of the sales supervisor, the sales and supervisory lines may not be serviced by the same PBX or local switch. The sales supervisor is thus unable to monitor this outside sales line because a mechanical connection or bridge cannot be established between the sales and supervisory lines. As a result of this drawback, the sales supervisor does not have the flexibility to monitor more than the local sales force. Thus, a great disadvantage of prior art monitoring systems is that the monitoring of calls must take place at a location close to the monitored line. This may be impossible for businesses having a sales office in one part of the country and a supervisory office in another part. Further, monitoring calls in the close proximity of the monitored line may not be desirable or safe for law enforcement personnel.

In addition, the prior art requirement of a mechanical connection between each of the monitoring and monitored lines increases the labor and, hence, the time and cost of installing and maintaining such systems.

Moreover, the restrictions of prior art systems to localized area monitoring results in only partial monitoring services. For example, if the monitored party handles telephone calls on several different telephone fines, each of these fines must be monitored. Such monitoring can be accomplished with prior art systems only through the connection of each of the monitored lines to a monitoring fine. However, the monitored party can speak generally to only one person at a time, and the time and effort used to set up and monitor the unused fines is wasted.

In addition, prior art systems are unable to monitor effectively all of the communications received by a person having a personal number service. Generally, a personal number service provides a personal number to each subscriber of the service. Communications such as telephone calls are directed (dialed) using the personal number. The personal number service locates the subscriber based on a predetermined fist of locations. The communication is routed to the subscriber at the location determined by the service according to the list of locations. Thus, a subscriber may receive a call dialed to the subscriber's personal number at home, at the office, or at any other location designated by the subscriber.

Unless there is a mechanical connection between each of the monitored lines and a monitoring fine, prior art systems are unable to monitor communications dialed to a personal number. In order to make a connection with each monitored line, the operators of prior art systems must know which fines will be used by the monitored party. Without such advance information, prior art systems are unable to track and monitor a person having personal number service as that person moves from place to place. Thus, a monitored party may defeat prior art systems by simply designating an unmonitored location to receive communications. For example, prior art systems may be used to monitor communications directed to a person's home or office by establishing a mechanical connection between the monitored and monitoring lines. However, a person having a personal number service can designate some other unmonitored location such as a customer's office, a drugstore, or even the corner telephone booth as a location for receiving communications. Communications received at these locations cannot be monitored by prior art systems unless the system operators are aware that the person uses such locations for receiving communications. Once the prior art system operators become aware of the use of a particular location to receive calls, a monitoring connection can be made. However, the monitored person can change the reception location with little effort using the personal number service. Thus, a party is able to change the location for receiving personal number communications more quickly than the monitoring party can set up a wiretap for a particular location.

Accordingly, there is a need for a communications monitoring system which provides a centralized system for controlling the monitoring of communications. In particular, there is a need for a system which provides for a network-based solution to communications monitoring so as to provide monitoring of communications regardless of the physical locations of the monitoring and monitored lines. There is also a need for a monitoring system which does not require a mechanical connection between the monitored and monitoring lines. In addition, there is a need for a system which allows for effective monitoring of communications to a called party having a personal number service. Further, there is a need for a system which provides for communications monitoring that is relatively inexpensive, that does not require additional on-premises equipment, and that is easy to maintain and to service.

SUMMARY OF THE INVENTION

As will be seen, the present invention satisfies the foregoing criteria. Stated generally, the communications monitoring system of the present invention allows a communication from a calling party to a called party to be monitored by a monitoring party. The present invention reads identification information associated with a communication, routes the communication to the called party, and establishes a bridge from the communication to the monitoring party in accordance with the identification information.

In particular, the present invention receives a communication directed to a called party, and reads the identification information associated with the communication. The identification information may comprise the calling line number of the calling line on which the communication was received, or may comprise the called party number such as the telephone number of the called party. The present invention obtains the identification information and searches for a matching entry to the identification information in a monitoring list.

Preferably, the monitoring list comprises an identifier for the monitoring party. The identifier may be a port number or a monitor calling line number. Based upon the identifier, the present invention routes the communication to the called party and establishes a bridge to the monitoring party. The communication may be monitored through this bridge without the calling party or the called party being aware of the monitoring. In one embodiment, the communication may be recorded through a bridge without the calling party or called party being aware of the recording. In another embodiment, the communication may be monitored as well as recorded through bridges without the calling party or called party being aware of the monitoring or of the recording.

In an embodiment, the present invention also provides, prior to establishing the bridge from the communication, for advising the monitoring party of the communication, for requesting disposition information regarding the communication from the monitoring party and for receiving the disposition information from the monitoring party. The disposition information may include an indication with respect to the monitoring of the communication and/or with respect to the recording of the communication. Based on this disposition information, the present invention provides for establishing a bridge from the communication to the monitoring party and/or to a recorder.

The method of the communications monitoring system of the present invention also provides for discontinuation of the monitoring of the communication. In response to receiving an indication from the monitoring party to disconnect, the present invention tears down the bridge. However, the communication remains connected between the called and calling party. Neither the calling party nor the called party will have been aware of the monitoring of the communication or of the discontinuation of the monitoring.

Stated generally, the present invention also provides a communications monitoring system apparatus which is based on a centralized system to allow a communication to a called party to be monitored by a monitoring party. The system generally comprises a switch, a database and a service node. The switch receives a communication, reads the identification information associated with the communication, and provides the identification information to the system database. This identification information may include the calling line number of the communication and/or the called party number.

The system database is functionally connected to the switch. In response to the receipt of identification information, the system database provides routing instructions to the switch, which in turn, provides the communication as well as the identification information to the system service node. The service node is also functionally connected to the switch. The service node obtains monitoring instructions for the communication from the service node's internal database. The monitoring instructions include an identifier for the monitoring party. The identifier may include a port number or a monitor calling line number. Based upon the monitoring instructions, the service node routes the communication to the called party. Using the identifier, the service node also establishes a bridge from the communication to the monitoring party so that the communication routed to the called party may be monitored by the monitoring party through the one-way connection. If the monitoring instructions provide for recording the communication, the service node also establishes a bridge from the communication to the recorder.

In an embodiment, prior to establishing the bridge from the communication, the service node advises the monitoring party of the communication, requests disposition information regarding the communication from the monitoring party and receives the disposition information. The disposition information may include an indication with respect to the monitoring of the communication and/or with respect to the recording of the communication. Based on this disposition information, the service node establishes a bridge from the communication to the monitoring party and or to a recorder.

The communications monitoring system apparatus of the present invention also provides for the discontinuation of monitoring. In response to receiving an indication from the monitoring party to disconnect, the service node has the bridge torn down. However, the communication remains connected between the called and calling party. Neither the calling party nor the called party will have been aware of the monitoring of the communication or of the discontinuation of the monitoring.

Advantageously, the present invention provides a centralized system allowing a communication to a called party to be monitored by a monitoring party. In particular, the present invention provides a network-based solution to communications monitoring so that a communication may be monitored regardless of the physical locations of the monitoring and monitored lines within the network. In addition, the present invention obviates the necessity of a mechanical connection or bridge between the monitored and monitoring lines. As a result, the present invention provides a flexible monitoring system wherein any line within the network may be readily designated for monitoring and wherein communications on that line may be monitored. The flexibility of the monitoring system of the present invention allows for effective monitoring of communications to a called party having a personal number service. In addition, the present invention provides a system for communications monitoring that is relatively inexpensive, that does not require additional on-premises equipment, and that is easy to maintain and to service.

Therefore, it is an object of the present invention to provide an improved communications monitoring system.

It is also an object of the present invention to provide a centralized system for controlling the monitoring of communications.

It is an additional object of the present invention to provide a network-based solution to communications monitoring.

It is a further object of the present invention to provide a system for monitoring communications from a location outside the local area to which the communications are directed.

It is another object of the present invention to provide a system which allows for effective monitoring of communications to a called party having a personal number service.

It is an additional object of the present invention to provide a monitoring system which does not require a mechanical connection between the monitored and monitoring lines.

It is yet another object of the present invention to provide a monitoring system that is relatively inexpensive, that does not require additional on-premises equipment, and that is easy to maintain and to service.

That the present invention and the preferred embodiment thereof overcome the drawbacks set forth above and accomplish the objects of the invention set forth herein will become apparent from the detailed description of the preferred embodiment to follow.

DETAILED DESCRIPTION

Figure 1:
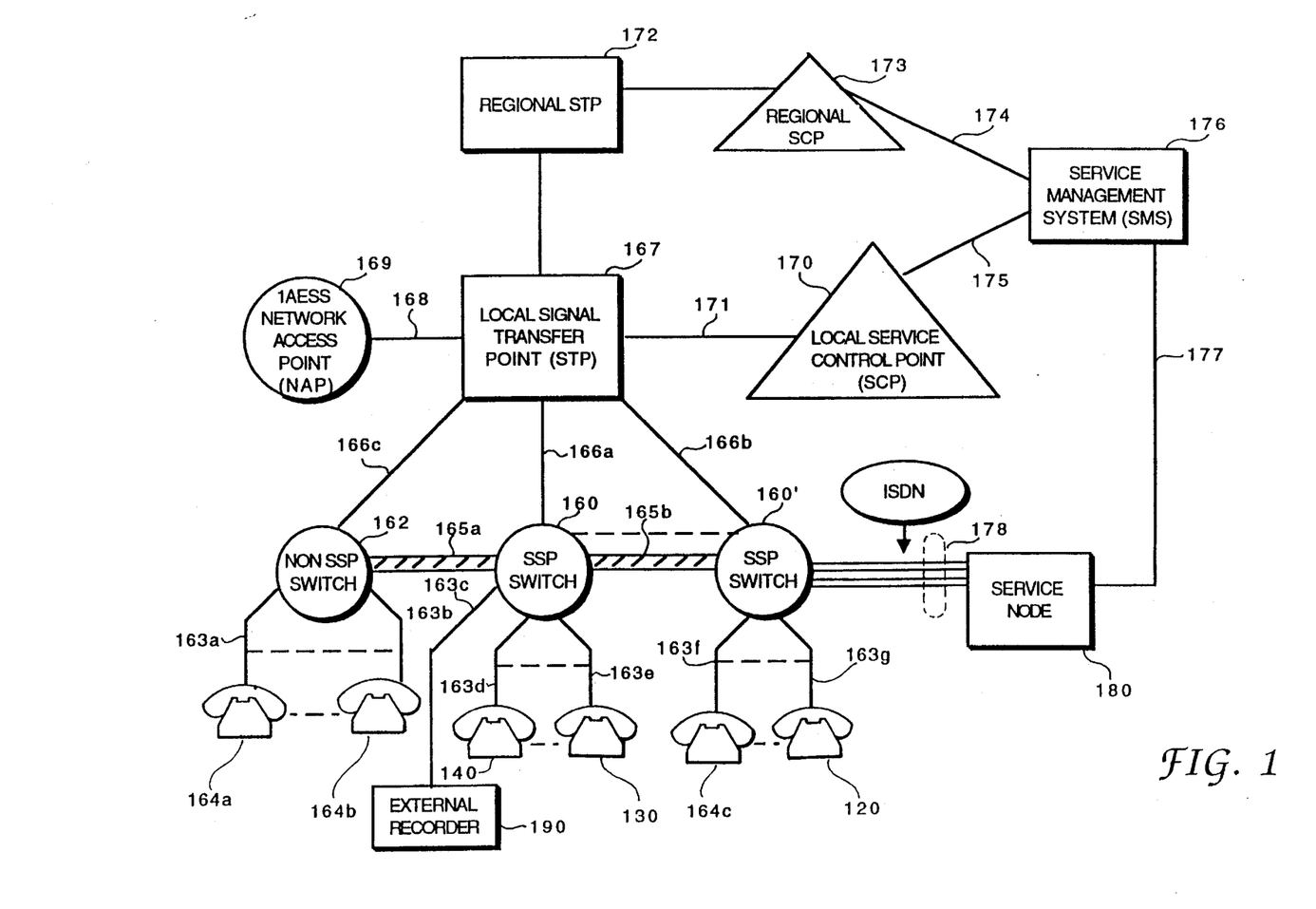
FIG. 1 is a block diagram illustrating the preferred environment of the preferred embodiment of the present invention.

Referring now to the drawings, in which like numerals indicate like elements throughout the several figures, FIG. 1 is a block diagram illustrating a part of the Advanced Intelligent Network (AIN) of a typical local exchange carrier, which is the preferred environment of the preferred embodiment of the present invention. The present invention includes a method and an apparatus for a communications monitoring system. Stated generally, the system allows a communication to a called party to be monitored by a monitoring party. The system reads identification information associated with a communication. In accordance with the identification information, the system routes the communication to the called party and establishes a unidirectional bridge from the communication to a monitoring party, whereby the communication may be monitored by the monitoring party through the bridge.

As shown in FIG. 1, the communications monitoring system preferably operates with the public switched telephone network (PSTN) and preferably with an advanced PSTN such as the Advanced Intelligent Network to deliver a communication with monitoring services from a calling party 120 to a called party 130, and to establish selectively a bridge from the communication to a monitoring party 140. Optionally, the communication may be recorded through a bridge from the communication to a recorder such as an internal recorder in the service node 180 or an external recorder 190. Generally, the monitoring party 140 is a person monitoring the communication such as the telemarketing supervisor or customer service supervisor. However, the monitoring party 140 may include a message service with recording capabilities to record the communication such as an answering machine or tape recorder. As used herein, the term "monitoring party" generally is used synonymously with the term "subscriber" to refer to a person that conducts the monitoring of the communication as well as subscribes to the monitoring services of the present invention. However, a monitoring party is not necessarily a subscriber and vice versa. Where the distinction is important, the appropriate term is used in the text.

The Advanced Intelligent Network comprises a plurality of central office switches, which are indicated as SSP switches 160–160' in FIG. 1. "SSP" is an acronym for service switching point. A service switching point is a switch, and the terms are used interchangeably herein. In the preferred embodiment, the service switching point is equipped with AIN software release 0.1 or higher release. BellCore Specification TRNWN 001284 Switching Systems Generic Requirements for AIN 0.1. The dashed lines between the switches indicate that the number of switches is arbitrary. The Advanced Intelligent Network also comprises non-SSP central office switches such as switch 162. The difference between an SSP and a non-SSP switch is that an SSP includes intelligent network functionality including appropriate hardware and software so that, when a set of predetermined conditions are detected, the SSP initiates a trigger for a predetermined state of a call on a subscriber line, generates the trigger as an appropriate message to be sent out over the Advanced Intelligent Network, and suspends handling of a call until the SSP receives a reply from the network instructing the SSP to take certain action. If the SSP receives no instructions within a certain amount of time, the SSP has a default task to execute with respect to the predetermined condition. Non-SSP switch 162 is an electronic switch that can generate certain rudimentary packets and provide them over the network, but the non-SSP switch must rely on other equipment to provide subscriber lines connected to such a non-SSP switch with more complex features and services available in the Advanced Intelligent Network. As illustrated in FIG. 1, both types of switches, SSP 160–160' and non-SSP 162, have a plurality of subscriber lines commonly designated as 163 connected thereto. Typically, the number of subscriber lines is on the order of 10,000 to 70,000 lines. Each subscriber line 163 is connected to a terminating piece of equipment including a plurality of telephones commonly designated as 164, and specifically including three telephones corresponding to calling party 120, called party 130 and monitoring party 140, respectively. A subscriber line 163c also connects SSP 160 to external recorder 190. It will be clear to those skilled in the art that the terminating equipment for calling party 120, called party 130, monitoring party 140, and external recorder 190 may be connected to one service switching point or to two or more different service switching points in the Advanced Intelligent Network. By way of example, FIG. 1 illustrates that the telephone equipment of calling party 120 is connected via subscriber line 163g to SSP 160', called party 130 is connected via subscriber line 163c to SSP 160, monitoring party 140 is connected via subscriber line 163d to SSP 160 and external recorder 190 is connected via subscriber line 163c to SSP 160.

Interconnecting switches 160, 160', 162 are a plurality of trunk circuits indicated as 165a and 165b in FIG. 1. These are the voice path trunks that interconnect the central office switches and over which calls are connected when completed. It should be understood that central office trunking in a typical urban environment is not limited to a daisy chain arrangement implied by FIG. 1. In other words, in a typical network, trunk circuits exist between central office switch 160' and central office switch 162.

Each of switches 160–160' and 162 is connected to a local signal transfer point (STP) 167 via respective data links 166a, 166b and 166c. Currently, these data links are 56 kilobit per second bidirectional data links employing a signaling protocol referred to as Signaling System 7 (SS7), which is well known to those skilled in the art. STP 167 is simply a multi-port high speed packet switch that is programmed to respond to the routing information in the SS7 protocol, and route the packet to its destination. STPs are conventionally installed in redundant pairs with accompanying data links. The redundant devices are not illustrated for sake of simplicity in the drawings. Also connected to STP 167 over SS7 data link 168 is a 1AESS network access point (NAP) 169, which is a computing device programmed to detect trigger conditions. It requires the support of an SSP switch to notify AIN systems of these trigger detection events. AN SSP can support multiple NAPs.

Much of the intelligence of the Advanced Intelligent Network resides in the local service control point (SCP) 170 that is connected to STP 167 over SS7 data link 171. As is known to those skilled in the art, SCPs are physically implemented by relatively powerful fault tolerant computers. Typical implementation devices include the Star Servicer FT Model 3200 or the Star Server FT Model 3300, both sold by American Telephone & Telegraph Company. Typically, SCPs are provided in redundant pairs. Among the functions performed by SCPs is the maintenance of network databases used in providing services. In addition, SCPs include databases that identify particular service customers. In order to keep the processing of data and calls as simple as possible, a relatively small set of triggers is defined at the switches for each call. A trigger in the Advanced Intelligent Network is an event associated with a particular subscriber line that generates a packet to be sent to a SCP. The trigger causes the SCP to query its database to determine whether some customized calling feature or enhanced service should be implemented for this particular call, or whether plain telephone service should be provided for the call. The results of the database inquiry are sent back to the switch from SCP 170 through STP 167. The return packet includes instructions to the switch as to how to process the call. The instruction may be to take some special action as a result of a customized calling service or enhanced feature, or may simply be an indication that there is no entry in the SCP's database that indicates that anything other than plain telephone service should be provided for the particular call. In response to receiving the latter type message, the switch moves through its call states, collects the called digits, and generates further packets that are used to set up and route the call. Similar devices for routing calls among various local exchange carders are provided by regional STP 172 and regional SCP 173.

Both regional SCP 173 and local SCP 170 are connected via respective data links 174 and 175 to a service management system (SMS) 176. The SMS also is implemented by a large general purpose computer and interfaces to business offices of the local exchange carrier and interexchange carriers. The SMS downloads information to the databases of SCPs 173 and 170 when subscribers modify their ensemble of AIN services. Similarly, SMS 176 downloads on a non-realtime basis, billing information that is needed in order to appropriately invoice telephone company subscribers for the services provided.

The Advanced Intelligent Network also includes service nodes (SNs) such as service node 180 illustrated in FIG. 1. Those skilled in the art will be familiar with service nodes, which are physically implemented by the same types of computers that embody the SCPs 170, 173. Service node 180 includes voice and DTMF signal recognition devices and voice synthesis devices. Service node 180 is connected to service management system 176 via data link 177. In addition, service node 180 typically is connected to one or more (but usually only a few) switches via Integrated Service Digital Network (ISDN) links shown as 178. Although the preferred environment has been described to include central offices, the present invention may be configured to operate with other telecommunications switching mechanisms including a private branch exchange (PBX).

In particular, the system of the present invention receives at a service switching point such as, at SSP 160', a communication such as a telephone call from a calling party 120 on a calling line assigned a calling line number. The communication is directed to called party 130 through use of a called party number such as a telephone number entered by the calling party 120 and associated with the communication in a manner well known to those of ordinary skill in the art. Preferably, the communication is routed from the receiving SSP 160' through the Advanced Intelligent Network on the basis of the called party number until the communication reaches a service switching point 160 which serves communications directed to the called party number.

Associated with the communication is identification information. The identification information may include the calling line number such as the telephone number associated with the telephone where the communication was initiated or placed, and/or the called party number such as the telephone number associated with the telephone of the called party. This identification information is read in a manner well known to the art by elements of the Advanced Intelligent Network, including service switching points, as the communication is routed from the calling party 120 to the called party 130. With respect to monitoring services, the service switching point closest to the party to be monitored (calling party or called party) preferably reads the identification information and checks with its associated service control point for routing instructions. Thus, as illustrated in FIG. 1, if a communication to called party 130 is to be monitored, service switching point 160 reads the identification information associated with the communication and checks with service control point 170 for routing instructions. The inclusion and reading of information to trigger special handling of a communication is well known to those skilled in the art. Preferably, switching point 160 provides service control point 170 via signal transfer point 167 with the identification information associated with the communication.

Service control point 170 maintains a routing list for calling lines having special services. In the preferred embodiment, the service control point 170 comprises a database including entries of numbers associated with calling lines accorded special treatment such as monitoring services. Generally, service control point 170 compares the identification information received from switching point 160 with entries in the database in order to determine whether the communication is to receive special services. In particular, in one embodiment, the calling line number associated with the communication as part of the identification information is identified. The service control point 170 compares this calling line number with entries in a database in order to determine whether the communication originating on the calling line having this calling line number should receive special services. This embodiment is used in connection with a monitoring party who chooses to monitor communications initiated from a particular telephone or calling line. An example of such a monitoring choice is a telemarketing supervisor who chooses to monitor outgoing communications placed by sales personnel on a particular calling line.

In another embodiment, the called party number associated with the communication as part of the identification information is identified. The service control point 170 compares this called party number with entries in a database in order to determine whether the communication directed to the calling line having this number should receive special services. This embodiment is used in connection with a monitoring party who chooses to monitor communications directed to a particular telephone or calling line. An example of such a monitoring choice is a customer service supervisor who chooses to monitor incoming communications placed by customers and received on a particular calling line. Upon finding a matching entry for special services, the service control point 170 provides the switching point 160 with routing instructions including the identity of the service node 180 to which the communication is to be routed. If a matching entry for special services is not found, the switching point 160 provides the communication with default treatment by routing the communication without special services.

In the preferred embodiment, upon receiving the routing instructions from the service control point 170, the switching point 160 routes the communication to the designated service node 180. Preferably, the switching point 160 provides the service node 180 with the identification information. Generally, the service node 180 compares the received identification information with entries in a database in order to determine whether the communication is to receive monitoring services. In the preferred embodiment, the service node 180 comprises a database including entries of numbers associated with calling lines accorded special treatment such as monitoring services. In particular, in one embodiment, the service node 180 reads the identification information associated with the communication and identifies the calling line number. In another embodiment, the service node 180 identifies the called party number. In yet another embodiment, the service node 180 identifies both the calling line number and the called party number. The service node 180 compares the identified calling line number, called party number or both with entries in a database in order to determine whether the communication is to receive monitoring services.

If a matching entry for monitoring services is not found, the service node 180 instructs the switching point 160 to provide the communication with default treatment by routing the communication to the called party without monitoring services. The service node 180 disconnects itself from the communication by sending a transfer message to the service switching point 160. The resulting communication (talk) path is from the calling party via one or more switching points and service transfer points as appropriate to the called party.

Upon finding a matching entry for monitoring services, the service node 180 checks for monitoring instructions associated with the matching entry in the database in a manner well known to those skilled in the art. The monitoring instructions associated with a matching entry form the basis for providing monitoring services with regard to a communication. The subscriber provides the information necessary to establish the monitoring instructions with respect to each calling line or called party number to be monitored. The administration of subscriber updates and changes to monitoring instructions are described below in connection with FIG. 2.

The monitoring instructions include monitoring service profile information such as an identifier for the monitoring party 140 for use in routing the communication. The identifier may be a monitor calling line number such as a telephone number for the monitoring party 140, or the identifier may be a port number for the monitoring party 140 or other information relating to the location of the monitoring party 140. The monitoring instructions preferably also include information regarding a subscriber's selected times for the engagement of monitoring services. For example, monitoring services may be selected to be engaged only on weekdays, and only between the hours of 8:00 A.M. to 6:00 P.M. In the preferred embodiment, a monitored communication may be recorded. Thus, the monitoring instructions also preferably include information regarding the recording of an eligible communication.

In addition, the monitoring instructions preferably include information as to the chosen type of the monitoring party's interaction with respect to the monitoring services. The three general types of monitoring interaction of the preferred embodiment include: (1) automatic monitoring; (2) selective automatic monitoring; and (3) selective communication monitoring. In the first type, automatic monitoring, all eligible communications are monitored and monitoring for each communication is set up automatically to a dedicated telephone line without interaction with the monitoring party.

In this automatic monitoring, a bridge for monitoring purposes is established automatically from an eligible communication to the monitoring party.

In the second type of monitoring interaction, selective automatic monitoring, the monitoring party provides an indication that monitoring services are to be engaged. After receipt of such an indication, monitoring for each eligible communication is set up automatically to a dedicated telephone line without further interaction with the monitoring party, until an indication to discontinue monitoring services is received from the monitoring party. In this selective automatic monitoring, a monitoring party may set aside a certain part of the day to handle monitoring responsibilities, thereby avoiding the interruptions to the remaining period of the day caused by automatic monitoring of all eligible communications.

In the third type of monitoring interaction, selective communication monitoring, the monitoring party is given the option of monitoring a communication prior to the engagement of monitoring services with respect to that communication. In this selective communication monitoring, the monitoring party may be as selective as desired as to the eligible communications that will be monitored.

In the preferred embodiment, the service node 180 reads the monitoring instructions and provides instructions with respect to the routing and monitoring of the communication to the switching point 160 based upon the monitoring instructions. If the monitoring instructions contain information that automatic monitoring services are to be provided, the service node 180 routes the communication to the called party 130 and initiates the establishment of a bridge between the calling party 120 and the called party 130. The service node 180 also routes the communication to the monitoring party 140 and initiates the establishment of a bridge from the communication to the monitoring party 140. The routing of the communication and establishment of the bridges are accomplished in a manner well known to those skilled in the art. Thus, three communication paths are established: (1) a first path between the calling party 120 to the service node 180; (2) a second path between the service node 180 to the called party 130; and (3) a third path from the service node 180 to the monitoring party 140 and/or the external recorder 190. In the preferred embodiment the first and second paths are bidirectional and the third path is unidirectional. These three communication paths are joined together at service node 180. It will be appreciated that paths (1) and (2) form a communication path between the calling party 120 and the called party 130. If monitoring is not desired or is discontinued by the subscriber then service node 180 sends an instruction to directly connect (transfer) paths (1) and (2) and to terminate (drop) the connections to service node 180 and the path (3) to the subscriber 140 and/or recorder 190. The bridge from the communication paths (1) and (2) to the monitoring party 140 via path (3) provides a means for the monitoring party to monitor the communication without either the calling or called party being aware of the monitoring.

In an embodiment, if automatic monitoring services are to be provided, the service node 180 checks whether a bridge already exists from the service node 180 through service switching point 160 to the monitoring party 140 and/or the external recorder 190. If not, the communication is routed and the bridges are initiated as described above. If the bridge to the monitoring party 140 already exists, then the service node 180 routes the communication and initiates the establishment of a bridge between the calling party 120 and the called party 130. Thus, three communication paths also are established in this embodiment, but the paths are added to the already existing path.

In an embodiment of the present invention, the subscriber has the option of setting temporal guidelines for the implementation of monitoring services. These guidelines are provided as a part of the monitoring instructions. For example, the subscriber may specify that automatic monitoring is to occur only during the hours between 9:00 A.M. and 6:00 P.M. on Monday–Friday. In this embodiment, prior to the routing of the communication and the initiation of the bridges, the service node 180 checks whether the temporal guidelines allow for the implementation of monitoring services with respect to the communication. This determination is carried out in a manner well known to those skilled in the art by a comparison between the service node's internal clock and the time fixed by the guidelines. If the guidelines allow the monitoring services, the communication is routed and the bridges are initiated as described above. If the guidelines do not allow the monitoring services, the communication is provided with default treatment.

In another embodiment of the present invention, the subscriber has the option of having the monitored communications recorded. In the preferred embodiment, the recorder is implemented by the service node 180. Preferably, authentication information is provided by the service node 180 in connection with each recorded communication. Authentication information comprises temporal information such as the time of day and day of the week of the communication and calling line information such as the calling line numbers of the calling and called party and associated names or other information. If automatic monitoring services with service node recording are selected by the subscriber, for each eligible communication, the service node 180 automatically routes the communication as explained above and also records the communication. In particular, the service node 180 routes the communication through the switching point 160 to the called party 130 and initiates the establishment of a bridge between the calling party 120 and the called party 130. The service node 180 also initiates the establishment of a bridge from the communication to the service node's recorder. The monitoring party 140 is able to monitor the communication and have it recorded without either the calling or called party being aware of the monitoring or of the recording.

However, the subscriber may opt to have the communication recorded by an external recorder 190, which may be, for example, a tape recorder or some other recording device which functions as a peripheral device to a telephone. If automatic monitoring services with external recording are selected by the subscriber, for each eligible communication, the service node 180 automatically routes the communication as explained above and also initiates the establishment of a bridge from the communication to the external recorder 190. The routing to the external recorder 190 is based on the telephone number of the external recorder 190 included as part of the monitoring instructions provided by the subscriber. The monitoring party 140 is able to monitor the communication and have it recorded without either the calling or called party being aware of the monitoring or of the recording.

If the monitoring instructions contain information that selective automatic monitoring services are to be provided then, upon receipt of an eligible communication, the service node 180 checks whether it has received an indication from the monitoring party 140 that monitoring services are to be engaged. In the preferred embodiment, the monitoring party 140 indicates that monitoring services are to be engaged by placing an administrative call to the system and the call is routed to the service node 180. Preferably, the monitoring party 140 can use any touch-tone telephone to dial in a preselected administrative telephone number. The service node 180 prompts the monitoring party 140, via prerecorded messages, to enter information relevant to the engagement of monitoring services. Such relevant information may include identification of the monitoring party 140 and the date and time to engage the monitoring services. In an embodiment, the service node 180 checks whether it has received an indication from the monitoring party 140 that monitoring services are to be engaged by checking whether a bridge already exists from the service node 180 through service switching point 160 to the monitoring party 140 and/or the external recorder 190.

If an indication to engage monitoring services has been received and any temporal guidelines have been met, the service node 180 routes the communication to be monitored pursuant to the automatic monitoring procedures described above. If an indication to engage monitoring services has not been received, or if the temporal guidelines have not been met, the service node 180 provides the communication with default treatment, which preferably comprises treating the communication as an ordinary communication. The service node 180 disconnects itself from the communication. The resulting communication (talk) path is from the calling party 120 to the called party 130.

With selective automatic monitoring services, the subscriber can choose to have only unmonitored communications recorded, only monitored communications recorded, all eligible communications recorded, or nothing recorded. The subscriber indicates the recording choice as part of the monitoring instructions. If only unmonitored communications are to be recorded, upon receipt of an eligible communication, the service node 180 checks whether an indication to monitor has been received from the monitoring party 140. If so, the service node 180 routes the communication for monitoring as described above without recording the communication. If the service node 180 has not received an indication to engage monitoring services, the service node 180 checks whether the recording is to be performed by the service node's recorder or by an external recorder 190. The service node 180 routes the communication through the switching point 160 to the called party 130 and initiates the establishment of a bridge between the calling party 120 and the called party 130. The service node 180 also routes the communication through the switching point 160 to the recorder and initiates the establishment of a bridge from the communication to the recorder. If the service node's recorder has been selected as the recorder the communication is bridged to the service node's recorder. If an external recorder has been selected, the communication is bridged to the external recorder 190. The unmonitored communication is recorded without either the calling or called party being aware of the recording.

Referring still to selective automatic monitoring services, if only monitored communications are to be recorded, upon receipt of an eligible communication, the service node 180 checks for a monitoring indication from the monitoring party 140. If no indication has been received, the service node 180 provides the communication with default treatment without recording the communication. If a monitoring indication has been received, the service node 180 checks whether the recording is to be performed by the service node's recorder or by an external recorder 190. After such check, the service node 180 routes the communication, initiates a bridge between the calling party 120 and the called party 130, initiates a bridge from the communication to the monitoring party 140, and initiates a bridge from the communication to the appropriate recorder. The monitoring party is able to monitor the communication and have it recorded without either the calling or called party being aware of the monitoring or of the recording.

Referring still further to selective automatic monitoring services, if all eligible communications are to be recorded, upon receipt of an eligible communication, the service node 180 checks whether the recording is to be performed by the service node's recorder or by an external recorder 190. After such check, the service node 180 routes the communication, initiates the establishment of a bridge between the calling party 120 and the called party 130 and initiates the establishment of a bridge from the communication to the appropriate recorder, as described above, whether or not a bridge from the communication to the monitoring party has been established.

If the monitoring instructions contain information that selective communication monitoring services are to be provided, upon receipt of an eligible communication, the service node 180 checks, in one embodiment, whether a bridge already exists from the service node 180 through service switching point 160 to the monitoring party 140 and/or the external recorder 190. If so, then the service node 180 routes the communication and initiates the establishment of a bridge between the calling party 120 and the called party 130. Thus, three communication paths also are established in this embodiment, but the paths are added to the already existing path. If a bridge does not exist, the service node 180 proceeds as described below.

In the preferred embodiment, upon receipt of an eligible communication, the service node 180 preferably initiates a call to the monitoring party 140 through the switching point 160. If the monitoring party's line is busy, or if there is no answer within a predetermined period or preselected number of rings, the communication receives default treatment as described above. The resulting communication (talk) path is from the calling party 120 to the called party 130. The preferred embodiment provides the monitoring party 140 with five rings to answer the call. In the preferred embodiment, the monitoring party 140 is unable to monitor the communication unless the call is picked up during the five rings. In other words, if the communication is routed to the called party 130 for failure of the monitoring party 140 to pick up the call, the monitoring party 140 is unable to start monitoring the communication.

If the monitoring party 140 answers the call from the service node 180 within a predetermined period or a predetermined number of rings, the monitoring party 140 is advised of the communication. The monitoring party 140 may be advised by direction of service node 180 of calling line information such as the calling line numbers of the calling and called parties and associated names or other information. The monitoring party 140 then is requested to provide information relating to the disposition of the communication. The monitoring party 140 has two choices: monitor the communication or decline to monitor the communication. In the preferred embodiment, the monitoring party 140 indicates the choice regarding the disposition of the communication by pressing a preselected number such as "1" on the touch-tone telephone used by the monitoring party 140. An indication to reject the communication may be provided by pressing a different preselected number such as "2" or by simply hanging up the telephone.

If the monitoring party 140 elects to monitor the communication, the service node 180 proceeds as if the monitoring services had been automatically implemented as described above. If the monitoring party 140 declines to monitor the communication, the communication is provided with default treatment also as described above.

With the selective communication monitoring services, the subscriber preferably has the same recording choices as provided by selective automatic monitoring services: record only unmonitored communications; record only monitored communications; record all eligible communications; or record nothing. These recording choices are carried out in the same manner as described above in connection with selective automatic monitoring services. However, with selective communication monitoring services, the subscriber preferably has the additional choice of recording only selected communications, monitored or unmonitored. The subscriber exercises this choice by providing the appropriate information in the monitoring instructions, and then by providing an indication for each eligible communication to be recorded. This latter indication is made in response to an announcement initiated by the service node 180. In the preferred embodiment, the monitoring party 140 indicates the choice to record a select communication by pressing a preselected number such as "3" on the touch-tone telephone used by the monitoring party 140. An indication to decline recording of the select communication may be provided by pressing a different preselected number such as "4". If the monitoring party 140 decides to monitor and to record the select communication, the service node 180 initiates the establishment of a bridge between the calling party 120 and the called party 130, and initiates the establishment of a bridge from the communication to the monitoring party 140 and to the appropriate recorder. If the monitoring party 140 declines to monitor the select communication, but elects to record the select communication, service node 180 initiates the establishment of a bridge between the calling party 120 and the called party 130 and initiates the establishment of a bridge from the communication to the appropriate recorder. The bridge provides a means to record the communication without either the calling or called party being aware of the recording.

Once the monitoring party 140 begins monitoring the communication, the monitoring party 140 may exercise the option of discontinuing monitoring at any time during the monitoring of the communication. To discontinue monitoring, the monitoring party 140 provides an indication to tear down the bridge from the communication to the monitoring party 140. In the preferred embodiment, the indication to tear down the bridge is made by pressing a preselected number on the touch-tone telephone used by the monitoring party 140, or by simply hanging up the telephone. The number may be the same number as, or a different number than, the number used to decline the option to monitor a call. Upon receipt by the service node 180 of an indication to tear down the bridge, the service node 180 tears down the bridge, whereby the monitoring of the communication is discontinued, but the communication remains connected between the calling party 120 and the called party 130. Thus, the calling party 120 communicates with the called party 130 without knowing that the monitoring party 140 was monitoring the communication, or that the monitoring party 140 discontinued monitoring the communication.

In an embodiment of the present invention, the discontinuance of monitoring results in the discontinuance of recording of the communication, if such recording is underway. Whether the recording is being carried out by the service node's recorder or an external recorder 190, discontinuance of the communication results in discontinuance of the bridge from the communication to the respective recorder.

In another embodiment of the present invention, a monitoring party 140 may exercise the option of discontinuing monitoring at any time during the monitoring of the communication, and indicate that recording of the communication is to continue despite the discontinuation of the monitoring. In this embodiment, the monitoring party 140 must indicate discontinuance of monitoring and continuance of recording by pressing a preselected number on the touch-tone telephone used by the monitoring party 140. In response to receipt of the indication by the monitoring party 140 to discontinue monitoring, but to continue recording, the service node 180 tears down the bridge from the communication to the monitoring party 140. However, the bridge from the communication to the recorder (service node's recorder or external recorder) remains in place. Thus, the calling party 120 continues to communicate with the called party 130 without knowing that the monitoring party 140 was monitoring the communication, that the monitoring party 140 discontinued monitoring the communication, or that the communication is being recorded.

Thus, the present invention's routing of a communication to a called party to be monitored may be summarized as beginning with the routing of the calling party's 120 communication to the switching point 160 serving the called party number. The switching point 160 reads the identification information associated with the communication and checks with the service control point 170 for routing instructions. Based on instructions from the service control point 170, the switching point 160 sends the communication to the service node 180. The service node 180 reads the identification information associated with the communication, and compares the relevant portions of the identification information to entries in a database. Upon finding a matching entry, the service node 180 reads the associated monitoring instructions. The service node 180 routes the communication through switching point 160 to called party 130, and initiates the establishment of a bridge between the calling party 120 and the called party 130. If the monitoring instructions provide for automatic monitoring, the service node 180 also initiates the establishment of a bridge through the switching point 160 from the communication to the monitoring party 140. If the communication is to be recorded, the service node 180 establishes a bridge to the appropriate recorder.

If the monitoring instructions provide for selective automatic monitoring, the service node 180 checks whether the monitoring party 140 has provided an indication to engage monitoring services. If not, the service node 180 provides the communication with default treatment. If the monitoring party 140 has provided an indication to engage monitoring services, the service node 180 initiates the establishment of a bridge between the calling party 120 and the called party 130. The service node 180 also initiates the establishment of a bridge from the communication to the monitoring party 140. In addition, the service 180 implements recording of the communication if the monitoring instructions contain recording instructions. If the monitoring instructions provide for selective communication monitoring, the service node 180 advises the monitoring party 140 of the communication and requests disposition information from the monitoring party 140. If the monitoring party 140 declines to monitor the communication, the service node 180 provides the communication with default treatment. If the monitoring party provides an indication to monitor the communication, the service node 180 also initiates the establishment of a bridge from the communication to the monitoring party 140. In addition, the service 180 implements recording of the communication if the monitoring instructions contains recording instructions. In this manner, the present invention allows a communication made on a selected calling line or a communication made to a selected calling line to be monitored by a monitoring party 140 and/or to be recorded without either the calling party 120 or the called party 130 being aware of such monitoring or of such recording.

The present invention may be used in connection with a personal number service used by a called party 130. Generally, a personal number service provides a personal number to each subscriber of the service. Communications such as telephone calls are directed (dialed) using the personal number. The personal number service locates the subscriber based on a predetermined list of locations. The communication is routed to the subscriber at the location determined by the service. Additional details regarding personal number services are found in the United States patent application entitled "Personal Number Communications System", Ser. No. 07/936,384, filed on Aug. 26, 1992, which is incorporated herein by reference.

In the present invention, a communication involving a personal number is treated similarly to a communication involving a conventional telephone number. The communication directed to a personal number may be monitored whether the monitoring services are directed to the calling line calling the personal number or to the personal number. In either case, the service control point 170 recognizes the personal number and consults appropriate entries in a database in order to provide the service switching point 160 with routing instructions. Based on instructions from the service control point 170, the switching point 160 sends the communication to the service node 180. The service node 180 recognizes the personal number and consults appropriate entries in a database for monitoring instructions. The service control point 170 preferably maintains the predetermined list of locations for a subscriber of the personal number service. Thus, the service control point 170 preferably provides the switching point 160 with information regarding the location of the called party 130 if the service control point 170 has information that the called party 130 is located elsewhere than at the destination corresponding to the called party number. The switching point 160 provides this location information to the service node 180 as part of the identification information associated with the communication. The service node 180 uses the location information to route the communication. Alternatively, the service node 180 may maintain the predetermined list of locations for a subscriber of the personal number service, thereby obviating the necessity of the location information transfer from the service control point 170.

As noted, in the preferred embodiment, the service node 180 routes the communication through switching point 160 to called party 130, and initiates the establishment of a bridge between the calling party 120 and the called party 130. In particular, if the called party number is a personal number, the service node 180 routes the communication based on the location information relating to the called party 130. If the called party is located elsewhere than at the destination corresponding to the called party number, the service node 180 routes the communication through service switching point 160, and if necessary, through the Advanced Intelligent Network, until the communication reaches a switching point serving the location of the called party 130. Such routing of the communication is accomplished in a manner well known to those skilled in the art. Once the communication is routed to the called party 130, the service node 180 initiates the establishment of the bridge between the calling party 120 and the called party 130. The service node 180 also initiates the establishment of a bridge from the communication to the monitoring party 140.

In the preferred embodiment, the initial set up of the monitoring instructions and other start up procedures of the present invention for any particular subscriber are performed on the system by a system administrator based on information provided by the subscriber. A system administrator preferably includes one or more persons employed by the entity operating the system. However, the features of the present invention may be activated or deactivated as to any particular subscriber by that subscriber, or any other party having the subscriber access information, through an administrative call to the system from any touch-tone telephone. The subscriber responds to prompts to provide the system with updated monitoring instructions.

Figure 2:
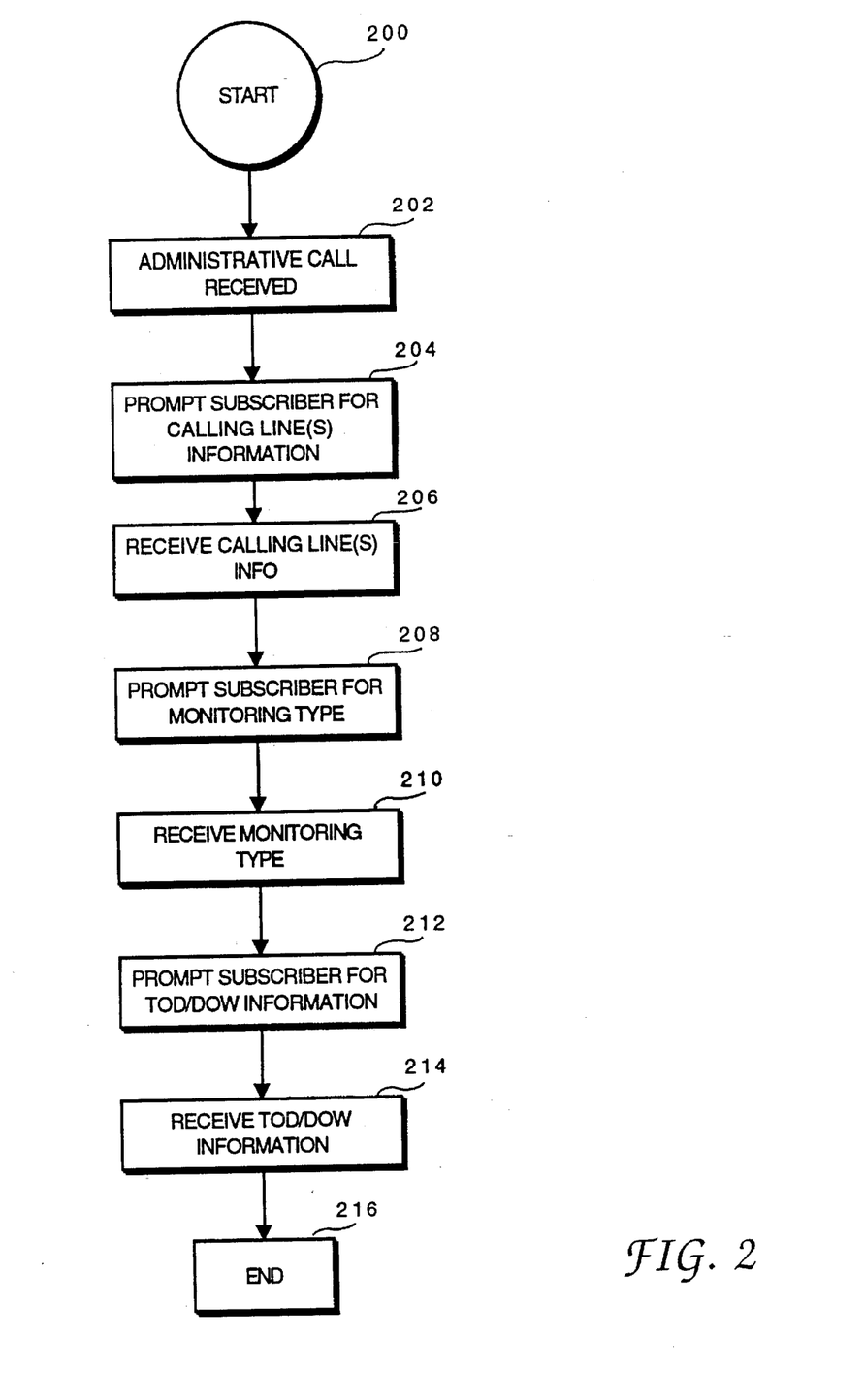
FIG. 2 is a flow chart illustrating the preferred general method of updating the monitoring instructions pursuant to the preferred embodiment.

FIG. 2 is a flow chart illustrating the preferred general method for use by a subscriber in updating the monitoring instructions. FIG. 2 is entered at step 200, and in step 202, the Advanced Intelligent Network receives an administrative call from the subscriber. Preferably, the subscriber uses any touch-tone telephone to dial in a preselected administrative telephone number for updating the monitoring instructions. The administrative call is routed to the service node 180. In step 204, the service node 180 prompts the subscriber, via prerecorded messages, to enter the calling line number(s) or called party number(s) to be monitored. In step 206, the service node 180 receives the calling line number(s) or called party number(s) and updates the monitoring instructions with this information. If the subscriber does not respond or does not respond properly, the service node 180 may repeat the prompt to the subscriber or proceed to end in step 216. In step 208, the service node 180 prompts the subscriber for a type of monitoring interaction. As described above, in the preferred embodiment, the subscriber may choose from three general types of monitoring interaction by the monitoring party: automatic monitoring; selective automatic monitoring, and selective communication monitoring. In step 210, the service node 180 receives the subscriber's choice of monitoring interaction and updates the monitoring instructions accordingly. Depending upon the type of monitoring interaction chosen, the subscriber may be prompted for additional information particular to the chosen monitoring interaction type. In step 212, the service node 180 prompts the subscriber for temporal information such as time of day and day of the week for engaging monitoring services, and in step 214, the service node 180 updates the monitoring instructions accordingly. This general method may be followed to prompt the subscriber for other information depending upon system requirements. The method of updating the monitoring instructions then proceeds to end in step 216.

Figure 3:
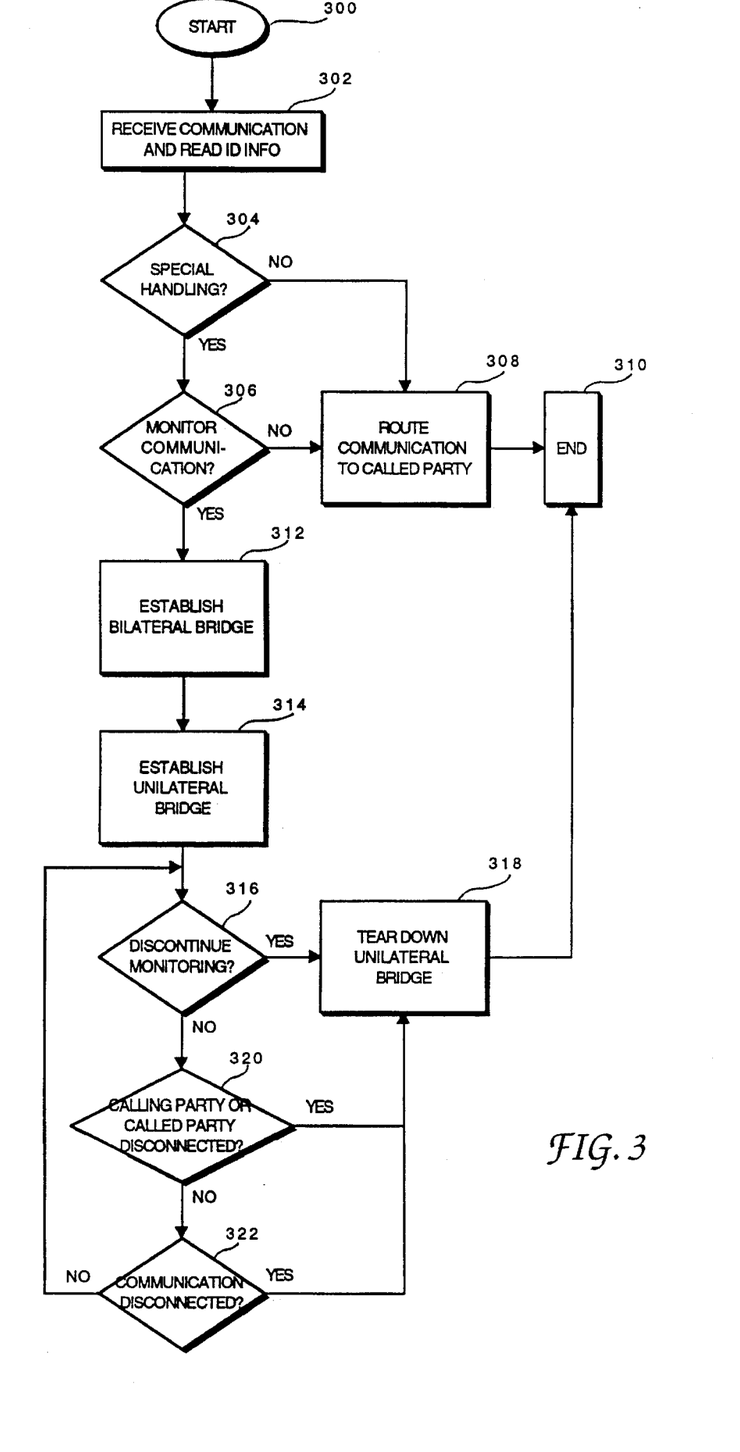
FIG. 3 is a flow chart illustrating the general method of processing a communication pursuant to the preferred embodiment.
Figure 4A:
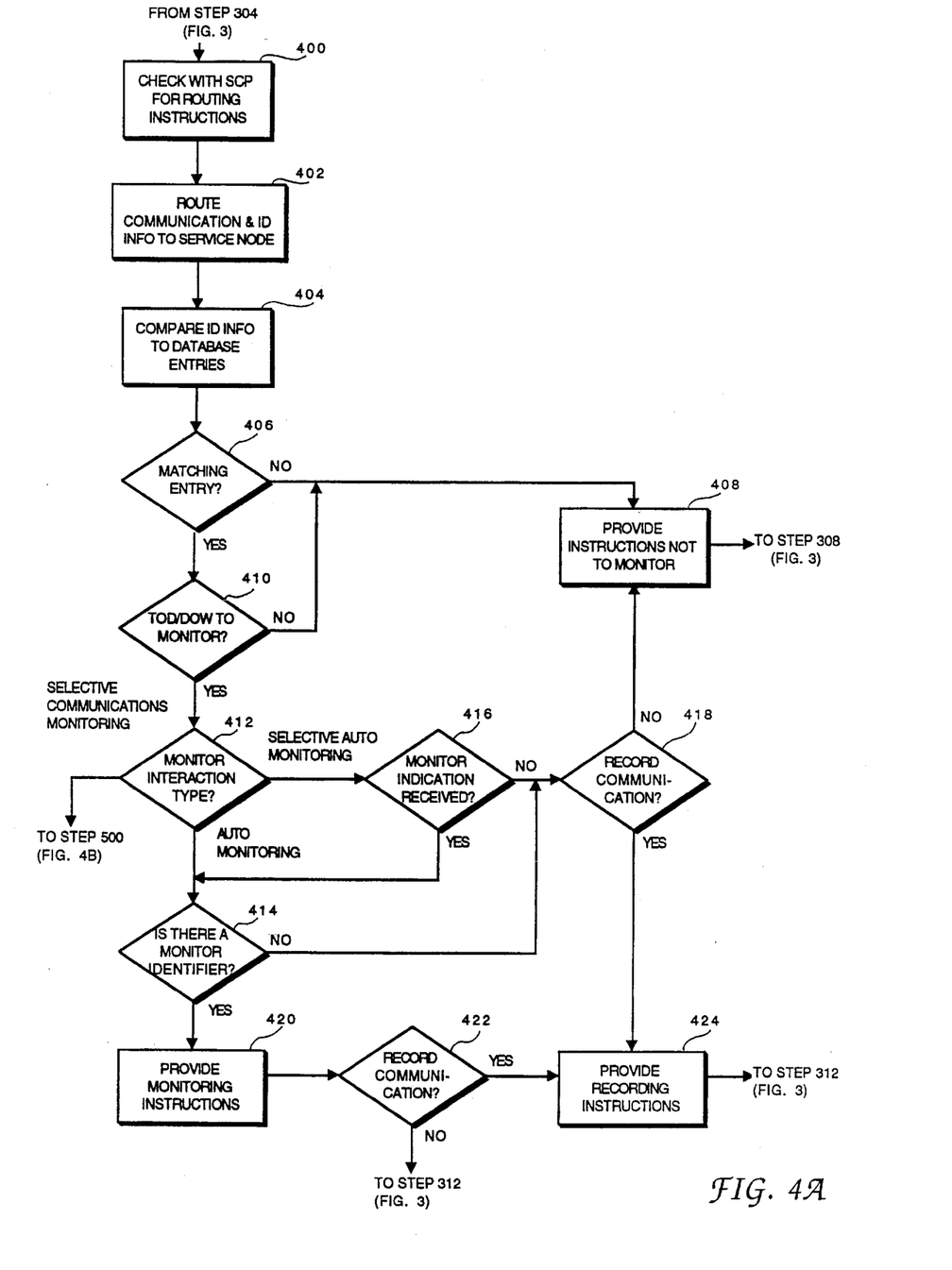
FIGS. 4A and 4B are a flow chart illustrating a detailed portion of the general method of the preferred embodiment as illustrated in FIG. 3.
Figure 4B:
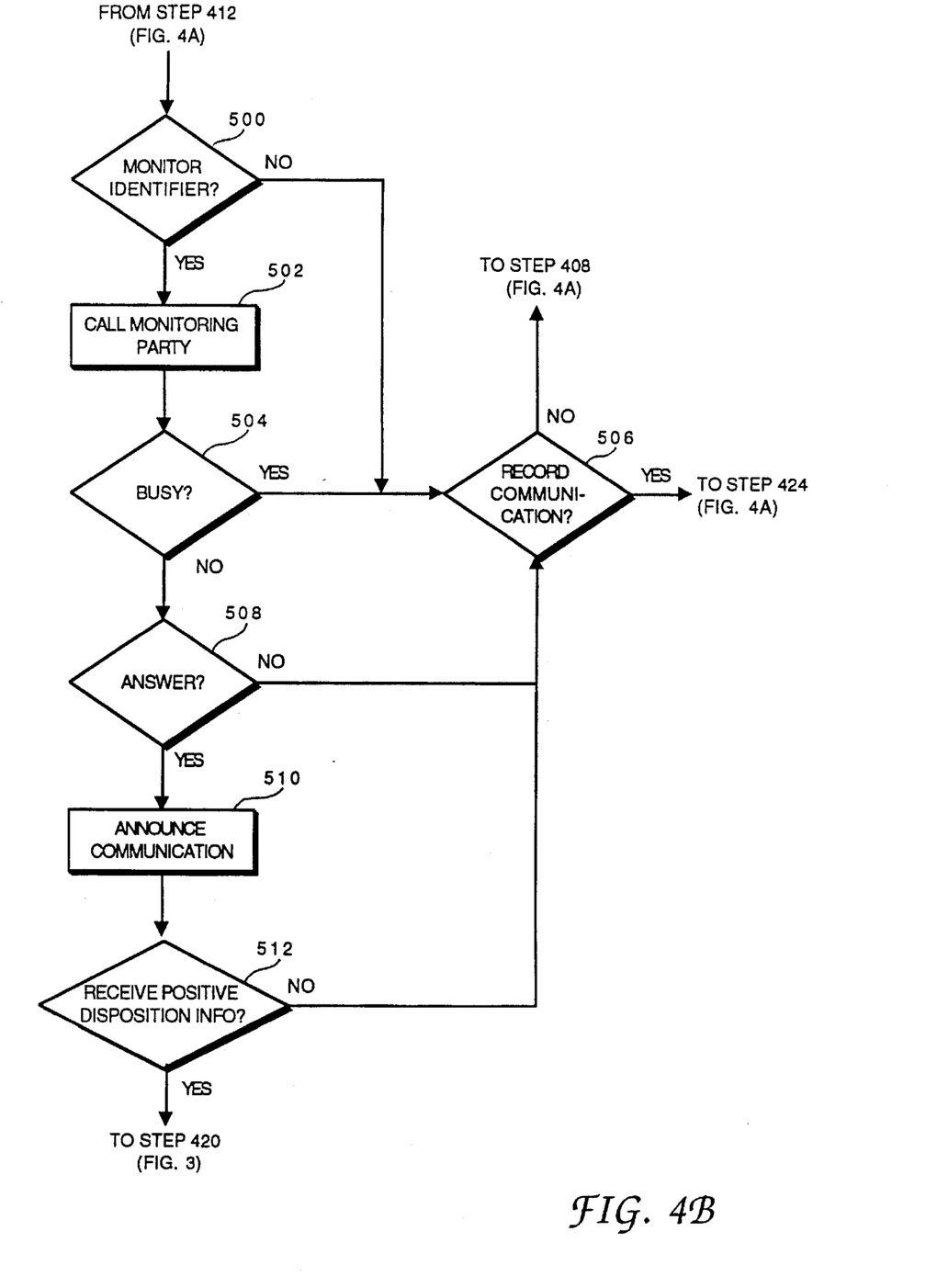

The flow charts in FIGS. 3–4 provide a detailed description of the process steps executed by the preferred embodiment of the communications monitoring system of the present invention. Using an analogy to electrical circuit diagrams, these flow charts are equivalent to a detailed schematic for an electrical circuit where the provision of the circuitry for electrical circuit blocks corresponds to provision of actual computer instructions for blocks of the flow chart. Thus, the coding of the process steps of these flow diagrams into instructions for suitable commercially available computers is a mere mechanical step for an engineer or other person skilled in the programming art.

FIG. 3 is a flow chart illustrating the general method of processing a communication pursuant to the preferred embodiment of the present invention.

FIG. 3 is entered at step 300 and, in step 302, the service switching point 160 receives the communication and reads the identification information associated with the communication. In most cases, reception of the communication is the result of a calling party 120 dialing the telephone number of the called party 130. As noted above in connection with FIG. 1, in the preferred embodiment, the communication is routed from the originating service switching point 160' through the Advanced Intelligent Network to a service switching point 160 which serves communications directed from the called party 120 or to the called party 130. In step 304, the switching point 160 checks the identification information for special handling instructions. The inclusion and reading of information to trigger special handling of a communication is well known to those skilled in the art. If there are no special handling instructions in the identification information, in step 308 the service switching point 160 routes the communication to the called party 130 and proceeds to end in step 310. If there are special handling instructions, in step 306 a determination is made as to monitoring of the communication. The monitoring determination is discussed in more detail below in connection with FIG. 4.

If the monitoring determination in step 306 is negative, in step 308 the service switching point 160 routes the communication to the called party 130 and proceeds to end in step 310. If the monitoring determination in step 306 is positive, in step 312 the service node 180 routes the communication through the switching point 160 and initiates the establishment of a bridge for the communication between the calling party 120 and called party 130. In step 314, the service node 180 also initiates the establishment of a bridge from the communication to the monitoring party 140. If the communication is to be recorded, the service node 180 initiates the establishment of a bridge from the communication to the appropriate recorder.

In step 316, the service node 180 checks whether it has received an indication to discontinue monitoring. If so, in step 318 the service node 180 and the service switching point 160 tear down the bridge from the communication to the monitoring party 140. However, the communication continues to be connected between the calling and called parties. The present invention then proceeds to end in step 310. This option to discontinue monitoring is most likely to be exercised by a monitoring party 140 who chooses to monitor just enough of a communication to get the necessary information, and then turns his/her attention to other matters, such as monitoring a next call.

If the service node 180 does not receive an indication to discontinue monitoring, in step 320 the service node 180 checks whether the calling party 120 or the called party 130 has disconnected. If either party 120, 130 has disconnected, in step 318 the service node 180 and service switching point 170 tear down the bridge to the monitoring party 140, and the present invention then proceeds to end in step 310.

If neither party 120, 130 has disconnected, in step 322 the service node 180 checks whether the communication has been disconnected. Such a disconnection may occur when the calling party 120 hangs up prior to the called party 130 answering. If the communication is disconnected, in step 318 the service node 180 and service switching point 160 tear down the bridge to the monitoring party 140, and the present invention proceeds to end in step 310. If the communication has not been disconnected, the service node 180 returns to step 316 and continues to repeat the checks of steps 316, 320, and 322 until one of the checks results in the proceeding to end in step 310. It will, of course, be appreciated that the conditions resulting in a "YES" determination at decision steps 320 and 322 will also cause end office 150 and service switching point 160 to tear down the bridge between calling party 120 and called party 130 in end step 310.

FIGS. 4A and 4B are a flow chart illustrating the preferred steps regarding the monitoring determination of step 306 illustrated in FIG. 3. After the service switching point 160 has read the identification information associated with the communication and found special handling instructions, in step 400 the service switching point 160 checks with its associated service control point 170 for routing instructions including the identity of the service node 180 to which the communication is to be routed. In step 402 the service switching point 160 routes the communication and associated identification information to the appropriate service node 18. In step 404 the service node 180 compares the identification information received from the switching point 160 with entries in a database to find a matching entry corresponding to the identification information. In step 406, the service node 180 checks whether there is a matching entry for monitoring services. If there is no matching entry, in step 408 the service node 180 instructs the service switching point 160 to provide the communication with default treatment by routing the communication to the called party 130 without monitoring services.

If there is a matching entry for monitoring services, in step 410 the service node 180 determines whether the subscriber has provided temporal guidelines for the implementation of monitoring services. Such guidelines, such as time of day (TOD) or day of week (DOW), are provided by the subscriber in the monitoring instructions. For example, the subscriber may have specified that monitoring services are to to be implemented only during the hours between 9:00 A.M. and 6:00 P.M. on Monday–Friday. If there are temporal guidelines, the service node 180 checks, in a manner well known to those of skill in the art, whether the guidelines have been met. In other words, the service node 180 checks the time held by its clock against the temporal guidelines to see whether it is the appropriate time to implement monitoring services. If the guidelines have not been met, in step 408 the service node 180 instructs the service switching point 160 to provide the communication with default treatment.

If the temporal guidelines have been met, or if there are no temporal restrictions, in step 412 the service node 180 determines the monitoring interaction type chosen by the subscriber. As described above, there are three types of monitoring interaction: automatic monitoring, selective automatic monitoring and selective communications monitoring. If the service node 180 determines that automatic monitoring has been chosen, in step 414 the service node 180 checks whether there is a monitor identifier associated with the matching entry. The monitor identifier includes information relating to the location of the monitoring party 140 or routing of the communication to the monitoring party 140 such as a monitor calling line number or a port number for the monitoring party 140. The absence of an identifier for the monitoring party 140 indicates that monitoring is not required. If there is no monitor identifier, in step 418 the service node 180 checks the monitoring instructions to determine whether the communication is to be recorded. As noted above, the recording may be carried out by an internal recorder in the service node 180 or an external recorder 190. The monitoring instructions include information as to how the recording is to be carried out. If the communication is not to be recorded, the service node 180 proceeds to step 408 to instruct the switching point 160 to provide the communication with default treatment. If the communication is to be recorded, the system proceeds to step 424 to provide the switching point 160 with instructions regarding recording of the communication. The system then proceeds to step 312 as discussed in connection with FIG. 3. Referring again to step 414, if there is a monitor identifier, in step 420 the service node 180 provides monitoring instructions, including an identifier for the monitor, to service switching point 160. The system then proceeds to step 422 and the service node 180 checks the monitoring instructions to determine whether the communication is to be recorded. If so, the system proceeds to step 424 described above. If not, the system proceeds to step 312 described above in connection with FIG. 3.

Referring again to step 412, if the service node 180 determines that selective automatic monitoring has been chosen as the type of monitoring interaction, in step 416 the service node 180 determines whether a monitoring indication has been received from the monitoring party 140. As described above, in this type of monitoring interaction, the monitoring party 140 effectively "turns on" monitoring services by placing an administrative call to the system and by indicating that monitoring services are to be implemented. If an indication to monitor has been received, the system proceeds to step 414. If no indication to monitor has been received, in step 418 the service node 180 checks the monitoring instructions to determine whether the communication is to be recorded. If not, the service node 180 proceeds to step 408 to instruct the switching point 160 to provide the communication with default treatment. If the communication is to be recorded the system proceeds to step 424 described above.

If the service node 180 determines that selective communication routing has been chosen as the type of monitoring interaction, in step 500 the service node 180 checks whether there is a monitor identifier associated with matching entry in the database. As noted above, the monitor identifier includes information relating to the location of the monitoring party 140. If there is a no monitor identifier, in step 506 the service node checks the monitoring instructions to determine whether the communication is to be recorded. The service node carries out the same type of recording check as carried out in step 418 describe above. If the communication is not to be recorded, the service node 180 proceeds to step 408 to instruct the switching point 160 to provide the communication with default treatment. If the communication is to be recorded, the system proceeds to step 424 described above. If there is a monitor identifier, in step 502 the service node 180 initiates a call to the monitoring party 140. In step 504, a check is made to determine whether the monitoring party's calling line is busy. If it is busy, then in step 506 the service node 180 preferably checks the monitoring instructions to determine whether the communication is to be recorded if the monitoring party is busy. If the communication is not to be recorded when the monitoring party is busy then, in step 408 the service node 180 instructs the service switching point 160 to provide the communication with default treatment. If the communication is to be recorded when the monitoring party is busy, the system proceeds to step 424 described above.

If the determination in step 504 is that the monitoring party's line is not busy, then in step 508 the service node 180 determines whether the monitoring party 140 has answered the call within a predetermined amount of time or a predetermined number of rings. If the monitoring party 140 has not answered within such time or within the predetermined number of rings, the service node 180 proceeds to step 506 to determine whether the communication is to be recorded. If not, in step 408 the service node 180 instructs the service switching point 160 to provide the communication with default treatment. If the communication is to be recorded, the system proceeds to step 414.

If the determination in step 508 is that the monitoring party 140 answered, in step 510 an announcement of the receipt of the communication is made to the monitoring party 140. As part of the announcement, the preferred embodiment also may provide some identification regarding the calling line or called party to be monitored including the source of the communication such as a calling line identification number and/or the name associated with the line. The preferred embodiment requests the monitoring party 140 for disposition information as to the monitoring of the communication. In particular, the service node initiates the playing of a prerecorded announcement that instructs the monitoring party 140 to press a preselected number on the touch-tone telephone used by the monitoring party to indicate a request to monitor the communication; to press a different preselected number to indicate a rejection of the offer to monitor the communication; and/or to press yet another preselected number to indicate a desire to have the communication recorded.

In step 512, the service node 180 checks whether the monitoring party 140 has indicated a desire to monitor the communication. If so, the service node 180 continues to step 420 described above and provides monitoring instructions. If positive disposition information has not been received from the monitoring party 140, such as a lack of response or a negative response, the service node 180 proceeds to step 506 described above to check the monitoring instructions to determine whether the communications is to be recorded.

While this invention has been described in detail with particular reference to the preferred embodiments thereof, it will be understood that variations and modifications can be effected within the spirit and scope of the invention as described hereinabove and as defined in the appended claims.

We claim:

1. In an intelligent switched telephone network, a method for allowing a communication in said intelligent switched telephone network from a calling party to a called party to be monitored by a monitoring party through said intelligent switched telephone network, regardless of the respective locations of said calling party, said called party or said monitoring party, comprising the steps of:

receiving said communication in said intelligent switched telephone network;

reading identification information associated with said communication for a calling line or called party number;

searching for a matching entry to said calling line or called party number in a monitoring list maintained by said intelligent switched telephone network, said searching being conducted to determine whether communications to or from said calling line or called party number are to be monitored;

routing said communication through said intelligent switched telephone network from said calling party to said called party; and only in response to finding said matching entry, establishing a bridge from said communication to said monitoring party, said bridge allowing said monitoring party to monitor said communication through said intelligent switched telephone network regardless of the respective locations of said calling party, said called party or said monitoring party.

2. The method of claim 1 or 3, wherein said matching entry comprises an identifier for said monitoring party, and
   wherein said step of establishing said bridge comprises routing said communication to said monitoring party at a location specified by said identifier.

3. The method of claim 2, wherein said identifier comprises a port number, and
   wherein said step of routing said communication to said monitoring party comprises establishing said bridge using said port number.

4. The method of claim 2, wherein said identifier comprises a monitor calling line number, and
   wherein said step of routing said communication to said monitoring party comprises establishing said bridge using said monitor calling line number.

5. In an intelligent switched telephone network, a method for allowing a communication in said intelligent switched telephone network from a calling party to a called party to be monitored by a monitoring party through said intelligent switched telephone network, regardless of the respective locations of said calling party, said called party or said monitoring party, comprising the steps of:
   receiving said communication in said intelligent switched telephone network;
   reading identification information associated with said communication for a calling line number or a called party number;
   searching for a matching entry to said calling line number or said called party number in a monitoring list maintained by said intelligent switched telephone network, said searching being conducted to determine whether communications to or from said calling line number or said called party number are to be monitored;
   routing said communication through said intelligent switched telephone network from said calling party to said called party;
   only in response to finding said matching entry,
   (a) advising said monitoring party of said communication;
   (b) receiving disposition information regarding said communication, said disposition information compromising an indication to monitor said communication; and
   (c) establishing a bridge from said communication to said monitoring party, said bridge allowing said monitoring party to monitor said communication through said intelligent switched telephone network regardless of the respective locations of said calling party, said called party or said monitoring party.

6. The method of claim 5, after said step of advising said monitoring party, further comprising the step of requesting said disposition information from said monitoring party.

7. In an intelligent switched telephone network, a method for allowing a communication in said intelligent switched telephone network from a calling party to a called party to be monitored by a monitoring party through said intelligent switched telephone network, regardless of the respective locations of said calling party, said called party or said monitoring party, comprising the steps of:
   receiving said communication in said intelligent switched telephone network;
   reading identification information associated with said communication for a calling line number or a called party number;
   searching for a matching entry to said calling line number or said called party number in a monitoring list maintained by said intelligent switched telephone network, said searching being conducted to determine whether communications to or from said calling line number or said called party number are to be monitored;
   routing said communication through said intelligent switched telephone network from said calling party to said called party;
   only in response to finding said matching entry, establishing a bridge from said communication to said monitoring party, said bridge allowing said monitoring party to monitor said communication through said intelligent switched telephone network regardless of the respective locations of said calling party, said called party or said monitoring party;
   monitoring for an indication from said monitoring party to tear down said bridge; and
   responding to said indication by tearing down said bridge.

8. The method of claim 1 or 3, after said step of establishing said bridge, further comprising the step of recording said communication.

9. The method of claim 8, wherein said step of recording said communication comprises recording authentication information.

10. An apparatus in an intelligent switched telephone network for connecting a communication in said intelligent switched telephone network from a calling party to a called party and allowing said communication to be monitored by a monitoring party through said intelligent switched telephone network, regardless of the respective locations of said calling party, said called party or said monitoring party, comprising:
    means for receiving said communication in said intelligent switched telephone network;
    means for reading identification information associated with said communication for a calling line number or a called party number;
    means for searching for a matching entry to said calling line number or said called party number in a monitoring list maintained by said intelligent switched telephone network, said searching being conducted to determine whether communications to or from said calling line number or said called party number are to be monitored;
    means for routing said communication through said intelligent switched telephone network to said called party; and
    means responsive to finding said matching entry for establishing a bridge from said communication to said monitoring party, said bridge allowing said monitoring party to monitor said communication through said intelligent switched telephone network regardless of the respective locations of said calling party, said called party or said monitoring party.

11. The apparatus of claim 10, further comprising:
    means for monitoring for an indication from said monitoring party to disconnect said bridge; and
    means responsive to said disconnect indication for causing said means for establishing to discontinue said bridge.

12. The apparatus of claim 10, wherein said means for establishing said bridge comprises means for recording said communication.

13. The apparatus of claim 10, further comprising:

means for recording said communication.

14. A communications system in an intelligent switched telephone network for allowing a communication in said intelligent switched telephone network from a calling party to a called party to be monitored by a monitoring party through said intelligent switched telephone network, regardless of the respective locations of said calling party, said called party or said monitoring party,, comprising in combination:

a switch operative to receive said communication in said intelligent switched telephone network from said calling party and to read identification information associated with said communication; and a service node functionally connected to said switch, said service node having a database containing monitoring instructions;

said switch being responsive to said identification information to provide said communication and said identification information to said service node; and said service node being responsive to said communication and said identification information to obtain said monitoring instructions for said communication from said database and to cause said switch to route said communication through said intelligent switched telephone network to said called party and to establish a bridge from said communication to said monitoring party, said bridge allowing said monitoring party to monitor said communication through said intelligent switched telephone network regardless of the respective locations of said calling party, said called party or said monitoring party.

15. The system of claim 14, wherein said identification information comprises at least one of a calling line number of said calling party or a calling line number of said called party and said switch provides at least one said calling line number to said database.

16. The system of claim 15, wherein said database is operative to search for said calling line number in a monitoring list to obtain said monitoring instructions.

17. The system of claim 14, wherein said monitoring instructions comprise a port number and said service node causes said switch to establish said bridge to said monitoring party using said port number.

18. The system of claim 14, wherein said monitoring instructions comprise a monitor calling line number and said service node causes said switch to establish said bridge to said monitoring party using said monitor calling line number.

19. The system of claim 14, wherein said service node is operative to receive an indication from said monitoring party to tear down said bridge and to respond to said indication by tearing down said bridge.

20. In an intelligent switched telephone network, a method for allowing a communication in said intelligent switched telephone network from a calling party to a called party to be recorded by a monitoring party through said intelligent switched telephone network, regardless of the respective locations of said calling party, said called party or said monitoring party, comprising the steps of:

receiving said communication in said intelligent switched telephone network;

reading identification information associated with said communication for a calling line number or a called party number;

searching for a matching entry to said calling line number or said called party number in a monitoring list maintained by said intelligent switched telephone network, said searching being conducted to determine whether communications to or from said calling line number or said called party number are to be recorded;

routing said communication through said intelligent switched telephone network from said calling party to said called party; and only in response to finding said matching entry, establishing a bridge from said communication to a recorder and recording said communication, said bridge allowing said monitoring party to record said communication through said intelligent switched telephone network regardless of the respective locations of said calling party, said called party or said monitoring party.

21. The method of claim 20, after said step of reading said identification information, further comprising the steps of:

advising a monitoring party of said communication; and receiving disposition information regarding said communication from said monitoring party, said disposition information comprising an indication to record said communication.

22. The method of claim 20, wherein said step of recording said communication comprises recording authentication information.

* * * * *